Oct. 30, 1962     J. C. CLARK     3,061,232

FISHING REEL WITH COMBINED POSITIVE AND FRICTION BRAKE

Filed May 17, 1960     2 Sheets-Sheet 1

INVENTOR.
JOSEPH C. CLARK
BY

Oct. 30, 1962        J. C. CLARK        3,061,232

FISHING REEL WITH COMBINED POSITIVE AND FRICTION BRAKE

Filed May 17, 1960        2 Sheets-Sheet 2

*INVENTOR.*
JOSEPH C. CLARK
BY
*Lloyd (signature)*

United States Patent Office

3,061,232
Patented Oct. 30, 1962

3,061,232
FISHING REEL WITH COMBINED POSITIVE AND FRICTION BRAKE
Joseph C. Clark, 4843 Backacher Lane, Orlando, Fla.
Filed May 17, 1960, Ser. No. 29,703
3 Claims. (Cl. 242—84.53)

This invention relates in general to fishing reels and more particularly to a simplified casting reel for responding to all casting operations without a high degree of skill and adapted to low cost manufacture including positive acting control features and construction adapted to complete disassembly and assembly without the use of tools.

Reels prior to this invention for accomplishing similar results were inherently complicated requiring precisely constructed anti-back lash and level winding mechanism which were costly to manufacture and difficult to clean and service. Furthermore, they required metal parts which required lubrication and were often subject to corrosion which limited proper performance.

The present invention overcomes the above objections and disadvantages by the provision of a reel adapted to manufacture from corrosion resistant plastic parts incorporating totally enclosed spool of novel design inherently providing anti-back lash and uniform winding features and a simplified thumb control for braking and locking the spool which are important objects of the invention.

Another object of the invention is the provision of a low mass spool construction and a relatively high gear ratio between the winding crank thereof for the rapid retrieving of the line when desired.

Another object of the invention is the provision of a thumb lever under the control of a detent means for shifting the spool from a neutral to brake to lock positions by the thumb of the hand grasping the casting rod.

A further object of the invention is the provision of a crank means including snap-on rotary handles.

Figure 1:
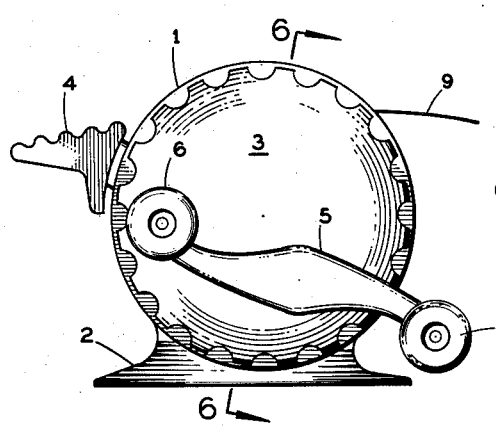
Figure 3:
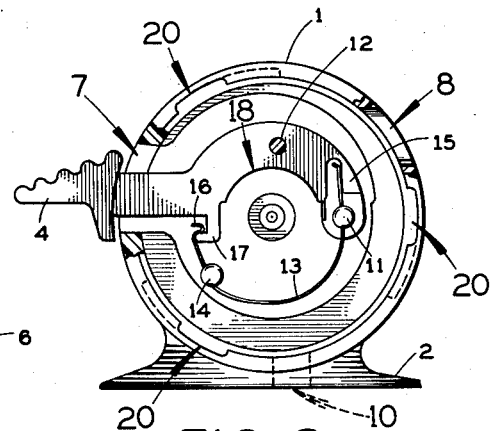
Figure 4:
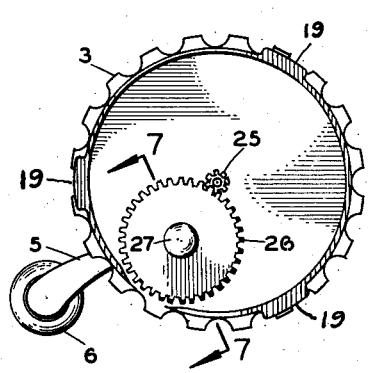
Figure 2:
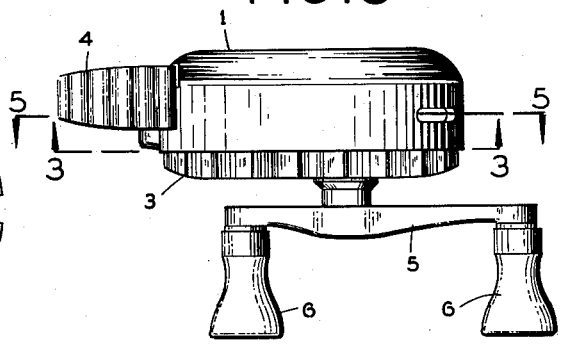
Figure 5:
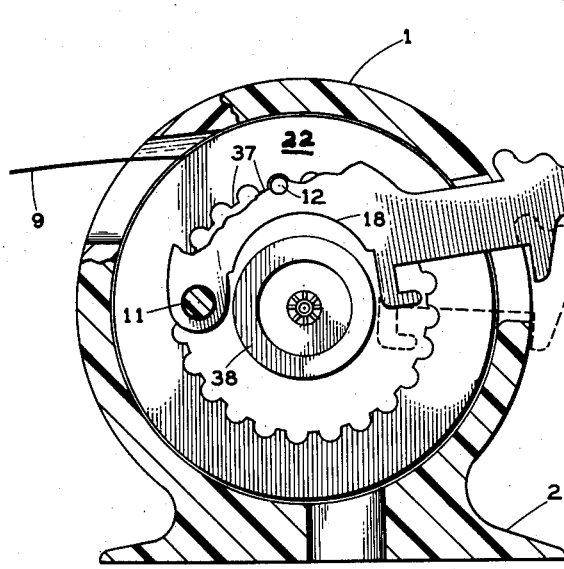
Figure 6:
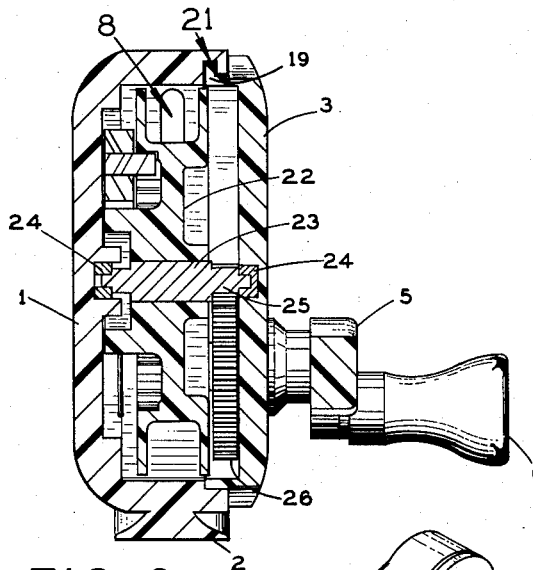
Figure 7:
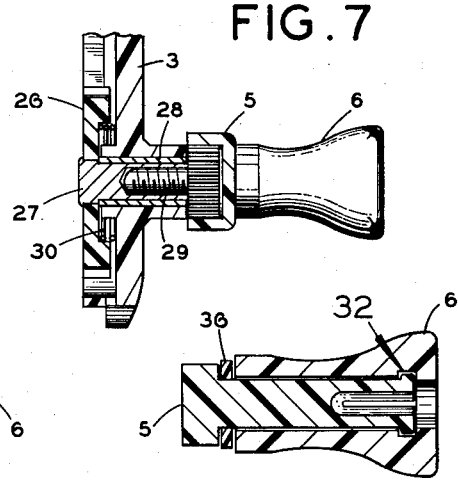
Figure 9:
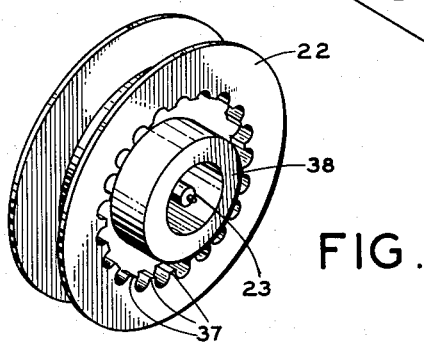
Figure 8:
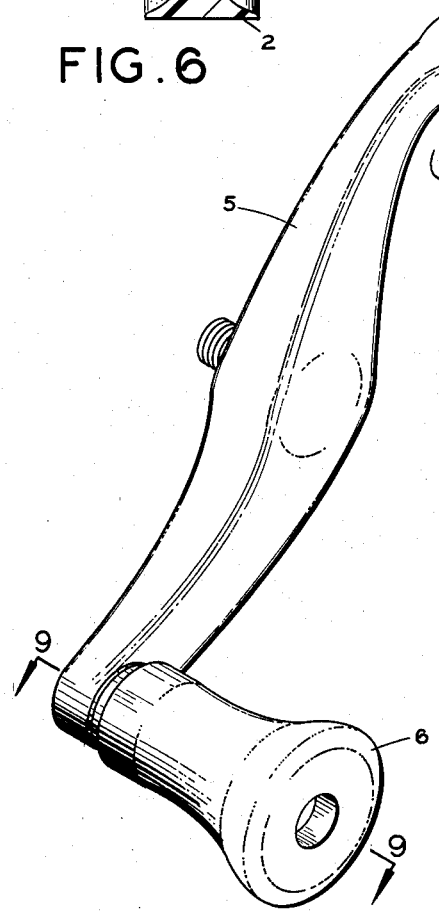
Figure 10:
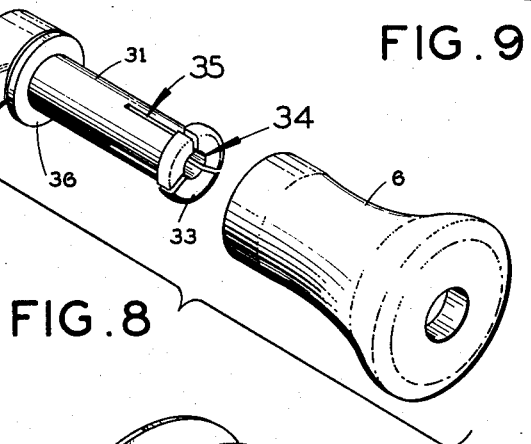

These and other objects and advantages in one embodiment of the invention are described and shown in the appended specification and drawings in which:

FIG. 1 is a right side elevation of the reel.
FIG. 2 is a plan view of the reel shown FIG. 1.
FIG. 3 is a side elevation taken through section line 3—3, FIG. 2.
FIG. 4 is an inside elevation of the cover member shown FIG. 1.
FIG. 5 is an enlarged cross sectional view taken through section line 5—5, FIG. 2.
FIG. 6 is a vertical cross sectional view taken through section line 6—6, FIG. 1.
FIG. 7 is a fragmentary cross sectional view taken through section line 7—7, FIG. 4.
FIG. 8 is an enlarged perspective exploded view of the crank shown FIG. 1.
FIG. 9 is a cross sectional view taken through section line 9—9, FIG. 8.
FIG. 10 is an perspective view of the spool shown FIGS. 5 and 6.

FIGS. 1 and 2 illustrate the general conformation of the reel in which a main housing 1 is adapted to be secured to a conventional casting rod by foot member 2. A cover member 3 is adapted to be secured to the housing by a breach-lock structure to be hereinafter described.

A thumb lever 4 projects from an aperture in the rear of the housing for the convenient operation by the thumb of the hand holding the rod. A balanced crank arm 5 terminates in two rotatable handles 6—6, as shown.

Referring to FIG. 3, in addition to the aperture 7 for the thumb lever 4, an elongated aperture 8 in the housing is for the guidance of the line 9.

Another aperture 10 is provided through the lower portion of the housing to drain water normally carried into the reel by the line. The inner end of lever 4 is pivoted on a cylindrical boss 11 integral with the housing 1 and a lock pin 12 is secured in the arm as shown for engagement with the spool to be hereinafter described.

A torsion spring 13 is tensioned to be retained on boss 11 and another boss 14 integral with the housing as shown. The right hand end of spring 13 normally urges against projection 15 on lever 4, as shown, and the opposite end of the spring 13 is formed to provide a detent 16 with an abutment 17 formed in lever 4 as shown.

A cylindrical brake surface 18 is formed in the lever 4 to engage the spool, the action of which will be hereinafter described.

Referring to FIG. 6, the cover 3 is provided with three internally projecting tongues 19 which are slightly tapered on one side thereof for passage in recesses 20—20—20 in housing 1, shown FIG. 3. Internal recesses 21 are adjacent recesses 20 whereby the cover is secured upon insertion and rotation therein in well known breach-lock fashion.

It is apparent that screw threads may be substituted for the breach-lock. The former, however, provides for a positive means for different placements of the cover with respect to the housing.

Referring to FIGS. 6 and 10, a relatively narrow spool 22 is made from low mass plastic material and has secured therein a coaxial axle 23, which axle is journalled at opposite ends thereof in oilless bearings 24—24 secured coaxially in the housing 1 and the cover 3 respectivelly. A pinion 25 is integral with the axle as shown for engagement with drive gear 26, FIGS. 4 and 6.

Referring to FIG. 7, drive gear 26 is secured to crank shaft 27 which is journalled on bushing 28 in housing 3. The crank 5 is provided with a cast-in screw 29 and threaded into shaft 27. A coil spring 30 is positioned in a pocket in one side of gear 26 and bears against the inner surface of housing 3 for providing predetermined small tension for frictionally resisting the rotation of the shaft 27.

It is now apparent that when the crank is rotated the spool 22 will rotate in opposite direction in a preferred ratio of approximately 5 to 1 and likewise the rotation of the spool when rotated by a casting line wound thereon will rotate the crank under the slight load offered by the bearings 24 and the bushings 28 and against the predetermined resistance of the spring 30.

Referring to FIGS. 8 and 9, a balanced crank 5 includes a pair of integral crank pins 31 at the outer ends thereof on which the handles 6 are journalled and referring to FIG. 9, a recess 32 in each handle is provided for clearance of a flange 33 at the end of each shaft. The outer end portion of the shaft 31 contains a bore 34 and three radial slots 35, thus providing for sufficient contraction of the flange 33 to forcibly install the handle 6 and because of the flexibility of the outer end portions of the shaft 31 when the handle is installed, the flange 33 will assume its normal shape as shown and thus retain the handle. A washer 36 is provided between the inner end of the handle and the lever to serve as a spacer and to minimize friction.

Referring to FIG. 10, an equi-spaced plurality of internal teeth 37 and a projecting brake drum 38 are integral and coaxial with the spool. In operation and referring to FIG. 5, when the lever 4 is in its normal upper position as shown in full lines, pin 12 is in engagement with teeth 37 which effectively locks the spool and the line 9 wound thereon, which position is normally maintained by the action of the detent member 17 shown in FIG. 3, and the end portion 16 of spring 13.

When the lever 4 is moved downward sufficiently far to disengage pin 12 from the teeth, the spool will be in neutral position. This position is also maintained by the detent members 16 and 17 and the lever is in the position shown FIG. 3.

When the lever 4 is moved to the lower dotted position shown FIG. 5, the braking surface 18 of the lever 4 will be in frictional contact with drum 38 and thus resist the rotation of the spool in proportion to the downward pressure applied to the lever. The right hand end of spring 13 will return the lever 4 to neutral position when pressure is not applied thereto.

In this embodiment of the invention, the housing 1, foot 2, cover 3, lever 4, spool 22, gear 26, lever 5, and handles 6 are made from molded "Delrin." However, other corrosion resistant relatively high impact plastic materials may be used.

The reel may be completely disassembled without tools by first placing the lever 4 in lock position and removing handle 5 by counter clockwise rotation thereof and then unlocking and removing the cover 3 from the housing by counter rotation thereof. Thus the spool, drive gear and crank shaft may be lifted from their normal positions and the lever 4 lifted from its anchor pin 11. The removal of spring 13 from the pins 11 and 14 complete the disassembly of the reel.

In operation, the spool and line are locked when lever 4 is in its normal upper position and at the beginning of a cast lever 4 is fully depressed to brake position, and at an appropriate time during the cast, the lever is released to neutral permitting the line to freely withdraw from the reel by virtue of the free rotation of the spool.

To limit the range of the cast, the thumb lever is again depressed to slow and brake the line to a stop in accordance with the pressure applied to the lever.

Because of the relatively narrow spool and guidance of the line through aperture 8, level winding mechanisms are not required since the natural close helical wind of the line on the hub of a spool and by virtue of the central location of aperture 8 the wind will traverse back and forth across the hub in a substantially level manner.

Back lash is effectively prevented by virtue of the relatively low mass of all rotating parts and the free passage of the line through the central aperture 8.

It is also to be noted that the relatively low gear ratio and the constant tension of spring 30 in gear 26 also stabilizes the rotation of the spool as added security against backlash.

It is to be understood that certain modifications of the above utilizing the features described are intended to come within the scope of the appended claims.

Having described my invention I claim:

1. A fishing reel for controlling a line comprising means forming a housing having a substantially cylindrical cavity therein, a spool journalled for rotation in said cavity on an axis coaxial with the principal axis of said cavity on bearing means in opposite sides of said housing, said spool having an integral pair of spaced parallel flanges with the outer edges thereof in close proximity to internal cylindrical surface of said housing for retaining said line wound between said flanges and said surface, an aperture means in said housing positioned for guiding said line through said housing to and from said spool, a plurality of internal circularly arranged teeth and a brake drum integral with one side of said spool and positioned coaxial therewith, a thumb lever pivoted at one end in said cavity on one side of said housing with the opposite end thereof extending through a clearance aperture in said housing for manual movement from a neutral position in opposite directions to a lock and a brake position respectively, said lever having a projecting abutment thereon positioned to engage one of said internal teeth for locking said spool against rotation in either direction when in said lock position when said lever is moved in one direction and including a brake surface thereon positioned to frictionally engage said drum when said lever is moved to said brake position in the opposite direction to said first named movement, detent means cooperatively associated with said lever and said housing for constraining said lever in said lock position when moved thereto from said neutral position, spring means for normally urging said lever from said brake to said neutral position, external crank means journalled for rotation in said housing on the side opposite the aforementioned said side for rotating said spool, gear means on said spool and said crank means in said housing meshed for rotating said spool a predetermined number of turns in one direction for each revolution of said crank means when rotated by said crank means in one direction and whereby the withdrawal of said line from said housing will rotate said crank means in opposite direction.

2. In a reel of the character described, a means forming a housing, a spool means journalled for rotation in said housing substantially enclosed thereby for winding and unwinding a line thereon when rotated in opposite directions respectively, said spool including a plurality of internal circularly arranged teeth and a brake drum coaxially positioned on one side thereof, a thumb lever pivoted at one end on one internal side of said housing and the opposite end thereof projecting through a clearance aperture in said housing for movement in opposite directions from a neutral position to a lock and a brake position respectively when manually operated, said lever having a lock projection and a brake surface located on opposite sides of said lever and positioned to alternately engage said teeth and said drum respectively when said lever is moved from said neutral to said lock and said brake position respectively for locking and braking said spool, spring means on said internal side of said housing engaged with said lever for normally urging said lever into said neutral position, a detent projection on said lever, said spring means including a detent means positioned for engaging said detent projection for constraining said lever in said lock position when the latter is moved thereto.

3. In a fishing reel of the character described, a hollow housing having an aperture therethrough for guiding a line,
   a spool journalled for rotation in said housing for retaining a line wound thereon running through said aperture,
   a drum on said spool coaxial therewith for braking said spool against rotation,
   a plurality of internal circularly arranged teeth coaxially positioned on said spool adapted for locking said spool against rotation in either direction,
   a thumb lever pivoted in said housing with one end thereof extending through a clearance aperture in said housing for manual movement from a neutral position in opposite directions to a lock and brake position respectively including a surface thereon positioned for frictional contact with said drum when said lever is moved to said brake position,
   a tooth means on said lever operatively positioned for engagement with said teeth for locking said spool against rotation in either direction when said lever is moved into said lock position, said tooth means and said braking surface being located on opposite sides of said lever, spring means associated with said lever for normally urging the latter from said brake into said neutral position, detent means cooperatively associated with said lever and said housing for constraining said lever in said lock position when the latter is manually moved from said neutral into said lock position.

References Cited in the file of this patent

UNITED STATES PATENTS

| | | |
|---|---|---|
| 54,225 | Smith | Apr. 24, 1866 |
| 349,804 | Locher | Sept. 28, 1886 |
| 520,517 | Corbin | May 29, 1894 |
| 1,896,582 | Hamilton et al. | Feb. 7, 1933 |
| 1,897,711 | Phillippe | Feb. 14, 1933 |
| 2,305,171 | Jones | Dec. 15, 1942 |
| 2,336,082 | Floraday | Dec. 7, 1943 |
| 2,564,975 | Holm | Aug. 21, 1951 |
| 2,587,462 | Goldberg | Feb. 26, 1952 |
| 2,610,002 | Surber | Sept. 9, 1952 |
| 2,688,261 | Hansen | Sept. 7, 1954 |
| 2,720,365 | Kovalchik et al. | Oct. 11, 1955 |
| 2,943,811 | Isbell | July 5, 1960 |
| 2,964,257 | Hull | Dec. 13, 1960 |
| 2,984,432 | Clark | May 16, 1961 |